(12) United States Patent
Tada

(10) Patent No.: US 6,352,487 B1
(45) Date of Patent: Mar. 5, 2002

(54) HYDRAULIC CHAIN TENSIONER WITH DIRECTIONAL VENT DEVICE

(75) Inventor: Naosumi Tada, Nabari (JP)

(73) Assignee: Borg-Warner Automotive K.K., Nabari (JP)

( * ) Notice: Subject to any disclaimer, the term of this patent is extended or adjusted under 35 U.S.C. 154(b) by 0 days.

(21) Appl. No.: 09/599,821

(22) Filed: Jun. 21, 2000

(30) Foreign Application Priority Data

Jul. 6, 1999 (JP) .......................................... 11-191218

(51) Int. Cl.[7] ................................................. F16H 7/08
(52) U.S. Cl. ...................................................... 474/110
(58) Field of Search ............................... 474/101, 109, 474/110

(56) References Cited

U.S. PATENT DOCUMENTS

| 5,346,436 A | 9/1994 | Hunter et al. ............... 474/101 |
| 5,700,213 A | 12/1997 | Sipson et al. ............... 474/110 |
| 5,707,309 A | 1/1998 | Simpson ..................... 474/110 |
| 5,879,256 A | 3/1999 | Tada ........................... 474/110 |
| 6,139,454 A | 10/2000 | Simpson ..................... 474/110 |
| 6,193,623 B1 * | 2/2001 | Kock et al. ................. 474/110 |

* cited by examiner

Primary Examiner—David A. Bucci
Assistant Examiner—Timothy McAnulty
(74) Attorney, Agent, or Firm—Sidley Austin Brown & Wood; Greg Dziegielewski

(57) ABSTRACT

The present invention relates to a mechanism to prevent the incorrect assembly of an air vent disc in a hydraulic tensioner. The hydraulic tensioner includes a housing having a chamber. A hollow plunger is slidably positioned inside the chamber. The chamber contains a spring which biases the plunger in a protruding direction and an air vent disc provided inside the plunger. An air vent disc includes a first portion and a second portion. The first portion has a groove as a vent channel and a through-hole. The second portion has a central hole and a plurality of grooves extending radially and opening into the outer periphery of the vent disc. The outer diameter of the second portion is larger than the inner diameter of the aperture located at the upper end of the plunger tip.

13 Claims, 9 Drawing Sheets

HYDRAULIC CHAIN TENSIONER WITH DIRECTIONAL VENT DEVICE

BACKGROUND OF THE INVENTION

The invention relates to a hydraulic chain tensioner for use with an associated chain or belt that drives an engine camshaft, balance shaft drive or the like. In particular, the hydraulic tensioner of the present invention is directed to an improvement of the construction of a hydraulic tensioner to prevent errors in the assembly of the vent device.

In general, a hydraulic tensioner includes a housing, a plunger inserted into a bore formed in the housing, and a spring that biases the plunger in the projecting or protruding direction. In the housing, a chamber is formed by assembling a hollow plunger into the bore of the housing. Oil is supplied to the chamber from an external oil pressure source. The pressurized oil acts on the plunger to cause the plunger to protrude from the housing bore and provide tension to an associated chain.

In a hydraulic tensioner, when air mixes with oil in the chamber, the plunger can be forced inwardly toward the housing due to compression of the mixed air and oil. The air/oil mixture compresses when the tension of the chain or belt increases and, as a result, the chain or belt tension can vary due to the reduced effectiveness of the tensioner.

A hydraulic tensioner, as disclosed in Japanese Laid-Open Patent No. 7-158703, discloses one proposed solution of such a problem. This hydraulic tensioner has a disc as a vent device inside the plunger. A spiral groove is formed on the disc surface. The starting end of the groove is located on the outer peripheral side of the disc surface and the terminal end is located at the center of the disc surface.

FIG. 10 shows the enlarged plunger tip portion of the hydraulic tensioner disclosed in the above-mentioned prior art patent publication. In the Figure, a hole 100a is formed at the tip of plunger 100 and disc 110 is inserted in inner chamber 100b formed inside hollow plunger 100. Spiral groove 110a is formed on one of the main surfaces (top surface) of disc 110. On a portion of the outer periphery of disc 110 a groove 110b is formed that extends in the direction of the center axis of the plunger and connects to the starting end of groove 110a.

In such a hydraulic tensioner, air mixed into the chamber passes to spiral groove 110a from groove 110b on the outer periphery of disc 110 and leaks out to the outside air together with hydraulic oil after passing through hole 100a of plunger 100. At such time, leakage of the oil in the chamber to the outside of the tensioner is controlled by the spiral form of groove 110a on the main surface of disc 110.

Typically, product inspection after assembly of the hydraulic tensioner involves checking the ability of the chamber to retain oil pressure by introducing hydraulic oil into the chamber and measuring the rate of leakage of oil from the hole at the plunger tip.

However, in a conventional hydraulic tensioner, a disc 110 that functions as a vent device is in a single round plate shape, so that, as shown in FIG. 11, disc 110 can be assembled in an up/down reversed fashion. When such assembly error occurs, air mixed into the chamber cannot be discharged outside of the tensioner because spiral groove 110a of disc 110 is not connected to hole 110a. of plunger 100. On the other hand, when such a hydraulic tensioner, assembled in error, is inspected in the same manner as above, the hydraulic oil in the chamber can pass groove 110b on the outer periphery of disc 110, pass through the gap between the disc's main surface and the plunger and leak out of the tensioner. The product can be judged to be acceptable, even in such case of incorrect assembly.

The objective of this invention is to offer a hydraulic tensioner that prevents incorrect assembly of the vent device and that eliminates such a conventional problem.

SUMMARY OF THE INVENTION

It is a first object of the present invention to provide a hydraulic chain tensioner including a housing with a bore formed therein. A hollow plunger is inserted slidably into the housing. The plunger has a tip with an open vent hole or aperture and a spring member that biases the plunger in the protruding direction. A vent device or disc is provided inside the hollow portion of the plunger. The vent device is composed of disc first and second portions. The first portion has a first main surface on which the vent channel is formed and the said second portion is provided on the second main surface which is on the opposite side to the first main surface. The second portion has a passage, the outer diameter of which is larger than the open vent hole in the plunger that connects to a hole in the center axis direction and extends to intersect the center axis and opens on the outer peripheral surface. The vent device is assembled into the plunger with the first main surface having a vent channel facing toward the tip of the plunger.

When the assembly is correct, fluid in the chamber passes the vent channel on the first main surface of the vent device, passes the open hole at the plunger tip and is discharged from the tensioner if fluid in the chamber is pressurized during product inspection. Air mixed in the chamber passes the vent channel on the first main surface of the vent device and leaks out to the outside air from the hole at the plunger tip.

On the other hand, when the second portion on the second main surface side of the vent device is facing the side of the plunger tip during assembly, that is, the top and bottom of the vent device are reversed in an incorrect orientation of assembly, a gap is formed between the second main surface of the vent device and the inner wall of the plunger tip because the outer diameter of the second portion of the vent device is larger than the open hole of the plunger.

When fluid is supplied to the chamber and pressure is applied inside the chamber, the fluid in the chamber flows into the passage from its opening on the outer surface of the second portion of the vent device, passes the hole in the center axis direction and is discharged in a large quantity to the outside of the tensioner.

The volume of fluid discharged from the hole at the plunger tip is large when incorrectly assembled, so that it can be separated from correctly assembled devices and, thereby, erroneous assembly of the vent device can be prevented.

It is a second object of the invention to provide a hydraulic tensioner with a vent disc having, a first portion with an outer diameter which is slightly smaller than the inner diameter of the plunger. The outer diameter of the first portion of the vent device is slightly smaller than the inner diameter of the plunger, so that a gap is formed between the outer diameter of the first portion of the vent device and the inner diameter of the plunger, and, thereby, the air mixed in the chamber passes the gap and moves to the side of the first main surface of the vent device and is discharged outside of the vent channel on the first main surface.

It is a third object of the invention to provide a hydraulic tensioner with a vent disc having a first portion with an outer diameter which is substantially equal to the inner diameter of the plunger and a groove in the center axis direction that connects to the starting end of the vent channel on the outer surface of the first portion. The outer diameter of the first portion of the vent device is substantially equal to the inner diameter of the plunger, so that when the vent device is assembled into the plunger, the outer diameter of the first portion of the vent device fits the inner diameter of the plunger without clearance. An axial groove connected to the starting end of the vent channel is formed on the outer periphery of the first portion of the vent device. Therefore, the air mixed in the chamber moves to the side of the first main surface of the vent device through the groove and is discharged outside from the vent channel on the first main surface.

It is a fourth object of the invention to provide a hydraulic tensioner which has a vent channel with a tortuous path from the starting end to the terminal end. The vent channel may be circuitous from the starting end to the terminal end so that flow of liquid leaking from the chamber is restricted and the leak volume is suppressed. Other shapes of vent channels are contemplated including a spiral-shaped vent channel or a vent channel composed of multiple linear portions that bend at least 90 degrees.

It is a fifth object of the invention to provide a hydraulic tensioner with a passage that opens on the outer surface of the second portion of the vent device extending radially from the center. When the top/bottom of the vent device are reversed during assembly into the plunger and when fluid is supplied to the chamber and pressure is applied to the chamber during product inspection, the fluid in the chamber enters into an axial hole from the radial passage and is discharged in large volume to the outside of the tensioner from the hole at the plunger tip.

It is an sixth object of the invention to provide a hydraulic tensioner with a groove-shaped passage that is formed on the end face of the second portion. The passage opening on the outer periphery of the second portion of the vent device can be a groove formed on the end face of the second portion.

It is a seventh object of the invention to provide a hydraulic tensioner with a vent device biased toward the tip side of the plunger by the force of a spring. The vent device is pushed toward the plunger tip by the force of the spring. Thereby, the first main surface of the vent device can be contacted closely with the inner wall of the plunger tip during correct assembly.

It is an eighth object of the invention to provide a hydraulic tensioner with a vent device built integrally with a pressure relief valve assembly, in which the pressure relief valve assembly is pressed toward the tip of the plunger by the said spring. The vent device has a through-hole that connects to the center hole of the second portion, at the center of the first portion of the vent device The vent device is assembled onto the pressure relief valve assembly and the pressure relief valve assembly is pushed toward the plunger tip by the spring. At the same time, a through-hole, that connects to the axial hole of the second portion, is formed at the center of the first portion of the vent device. Thereby, when the pressure on the inside of the chamber becomes high, the fluid in the chamber is discharged to the outside of the tensioner through the through-hole of the first portion and the axial hole of the second portion of the vent device. As a result, abnormally high pressure in the chamber is prevented and the integral assembly of the vent device with the pressure relief valve assembly makes the entire hydraulic tensioner compact.

It is a ninth object of the invention to provide a hydraulic tensioner with the outer diameter portion of the second portion of the vent device inserted into a hole formed on one end of the pressure relief valve assembly. The outer diameter of the second portion of the vent device is inserted into the hole formed on one end of the pressure relief valve assembly, so that the hydraulic tensioner can be made more compact.

It is a tenth object of the invention to provide a hydraulic tensioner with a passage in the housing that connects the chamber to the external pressure source. A passage to connect the chamber to the external pressurized fluid source is provided in the housing so that the fluid from the external pressurized fluid source is supplied to the chamber through this passage. A check valve is provided between the chamber and passage so that the flow of fluid to inside the chamber from the pressurized fluid source is permitted, but meanwhile, the reverse flow of fluid is blocked.

It is an eleventh object of the invention to provide a hydraulic tensioner with a check valve that permits the flow of fluid to the chamber but blocks the reverse flow of the fluid provided between the chamber and the passage.

For a more complete understanding of the invention, one should refer to the embodiments illustrated in greater detail in the drawings and described below by way of examples of the invention.

DETAILED DESCRIPTION OF THE PREFERRED EMBODIMENTS

Figure 1:
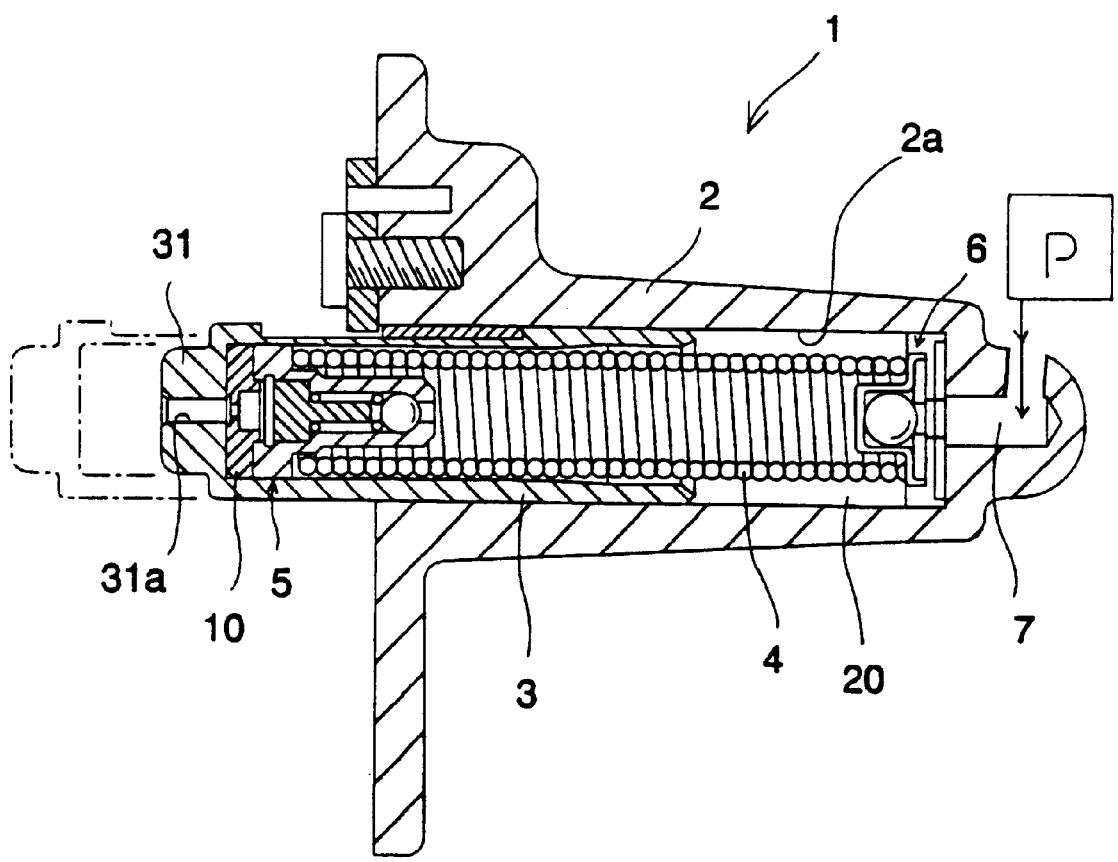
FIG. 1 is a cross-section of the hydraulic tensioner of the present invention.

As shown in FIG. 1, hydraulic tensioner 1 includes housing 2 having a hollow plunger 3 inserted slidably into bore 2a in housing 2 and spring 4, that urges or biases plunger 3 in the protruding direction from bore 2a.

In housing 2, chamber 20 is formed by the inner wall of bore 2a and the hollow plunger 3. Open hole 31a is formed at the center of tip 31 of plunger 3.

A ball check valve 6 is provided on the bottom wall of the chamber inside housing 2. This ball check valve 6 permits fluid to flow into the chamber 20, but blocks the reverse flow of fluid. Passage 7 that connects chamber 20 to the external pressurized fluid source (not shown) is formed in housing 2.

A pressure relief valve assembly 5 is provided on the side of tip 31 inside plunger 3. This pressure relief valve assembly 5 permits the fluid from chamber 20 to exit the tensioner chamber when the fluid pressure inside chamber 20 exceeds a set maximum value.

Air vent disc 10, as a vent device, is integrally assembled into pressure relief valve assembly 5. The force of spring 4 acts on plunger 3 via pressure relief valve 5 and air vent disc 10. Pressure relief valve assembly 5, air vent disc 10 and plunger tip 31 are in close mutual contact because of the force of spring 4.

Figure 2:
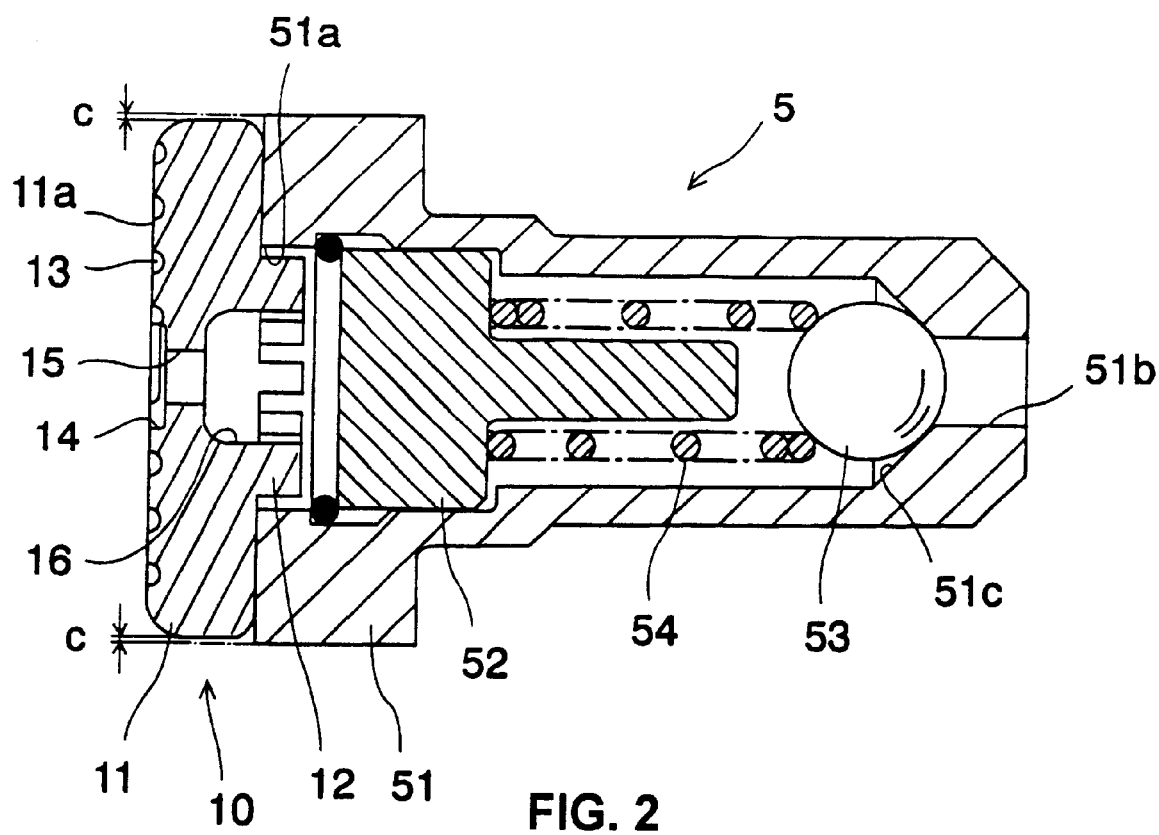
FIG. 2 is a partial enlargement of the hydraulic tensioner of FIG. 1, showing the air vent disc and pressure relief valve assembly.

FIG. 2 shows an enlargement of pressure relief valve assembly 5 and air vent disc 10. As shown in the figure, pressure relief valve assembly 5 includes valve housing 51 with apertures 51a and 51b on both ends and plug member 52, fixed to the inside of valve housing 51, ball 53, that can contact seat 51c formed in valve housing 51, and valve spring 54 that urges ball 53 onto seat 51c.

Figure 3:
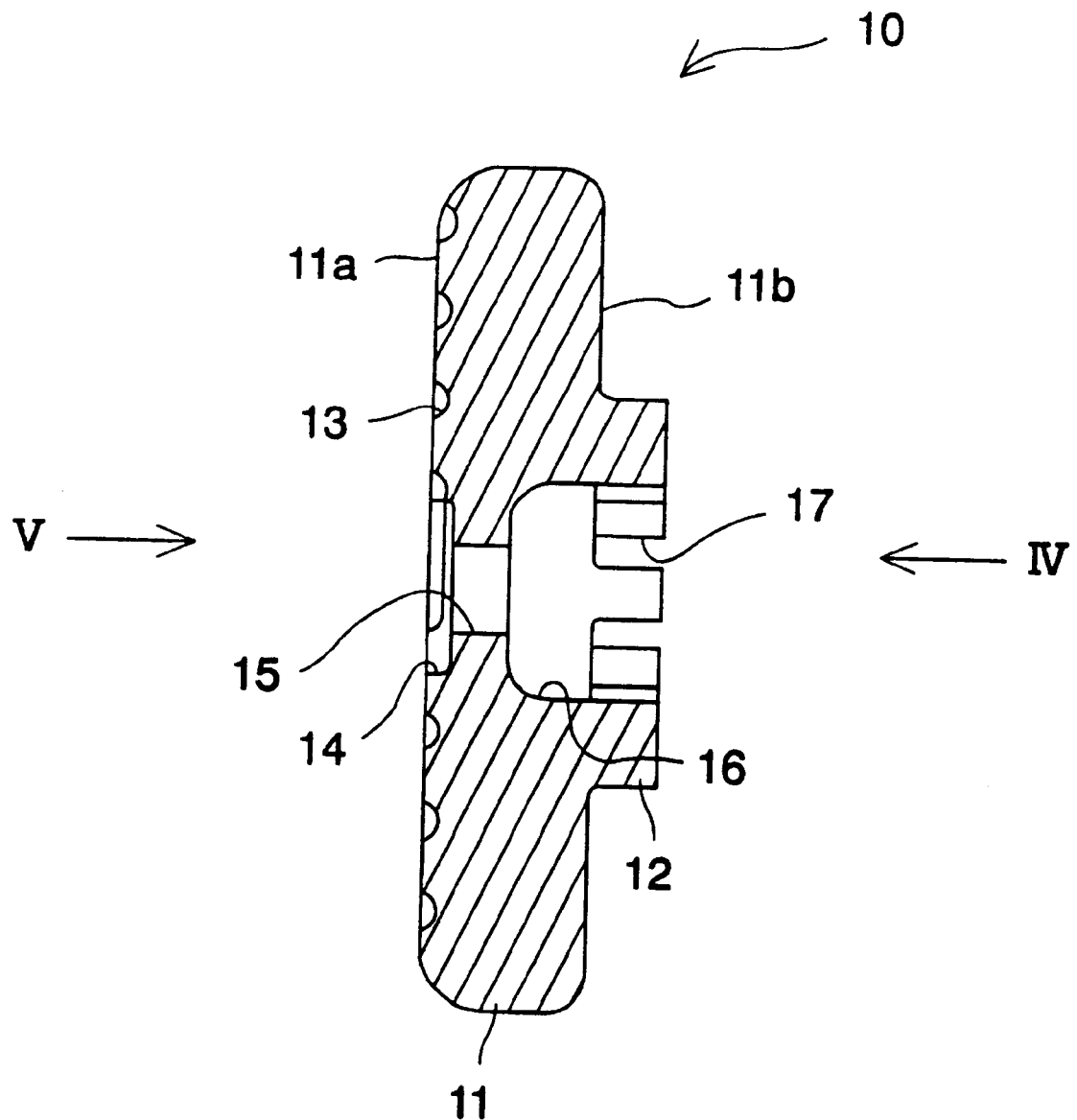
FIG. 3 is an enlarged cross-section of the air vent disc (through section III—III of FIG. 5).

As shown in FIGS. 2 and 3, air vent disc 10 has disc-shaped first and second portions, 11 and 12. Spiral groove 13 is formed on main surface 11a of first portion 11 and acts as a vent channel (see FIG. 5).

Figure 5:
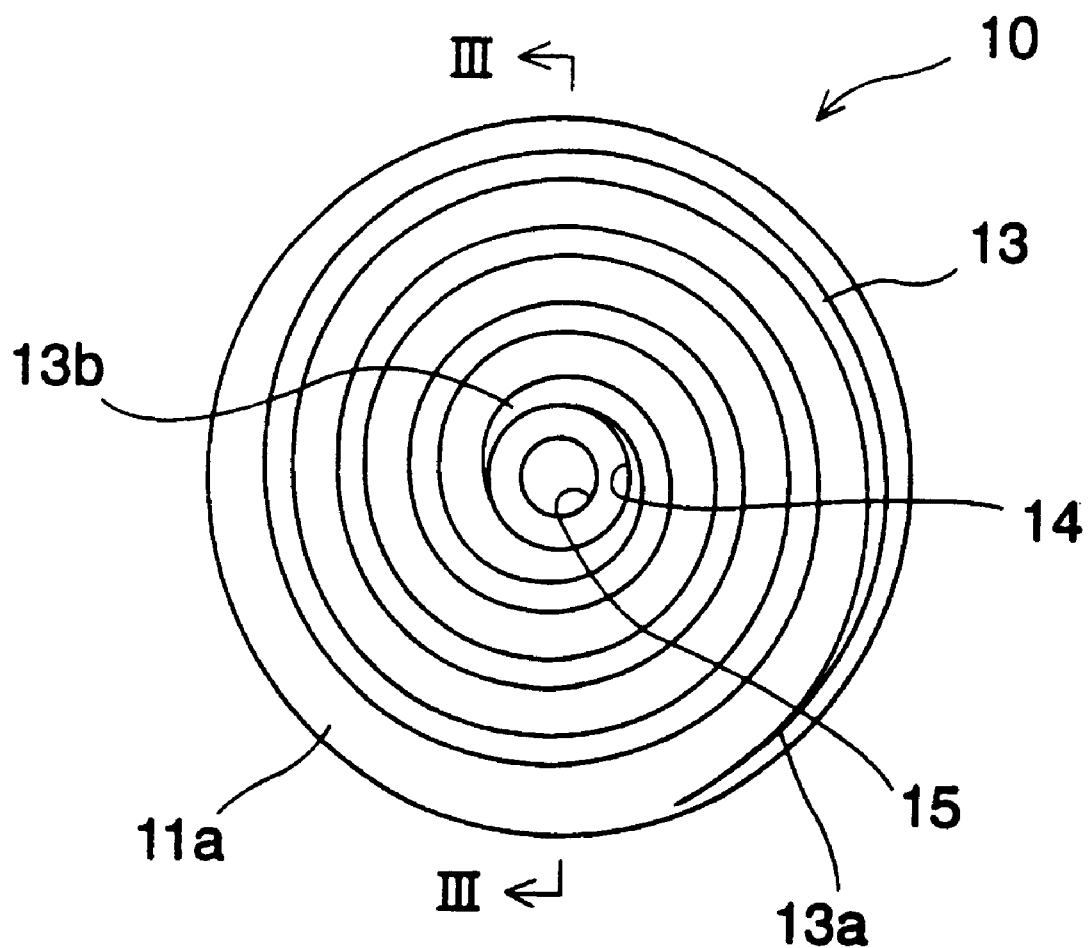
FIG. 5 is a view along arrow V of FIG. 3.

As shown in FIG. 5, starting end 13a of groove 13 narrows toward its tip and its terminal end 13b is connected to countersunk hole 14 at the center. Through-hole 15 that connects countersunk hole 14 is formed at the center of first portion 11.

The second portion 12 of air vent disc 10 is provided on main surface 11a of first portion 11 and opposite main surface 11b. When air vent disc 10 is assembled with pressure relief valve assembly 5, second portion 12 of air vent disc 10 is inserted into open hole 51a of valve housing 51 of pressure relief valve assembly 5 and thereby its entirety is constructed in a compact manner. The outer diameter d (FIG. 4) of the second portion 12 is larger than the inner diameter of open hole 31a at plunger tip 31. Hole 16 that connects to through-hole 15 of the first portion is formed at the center of second portion 12.

Figure 4:
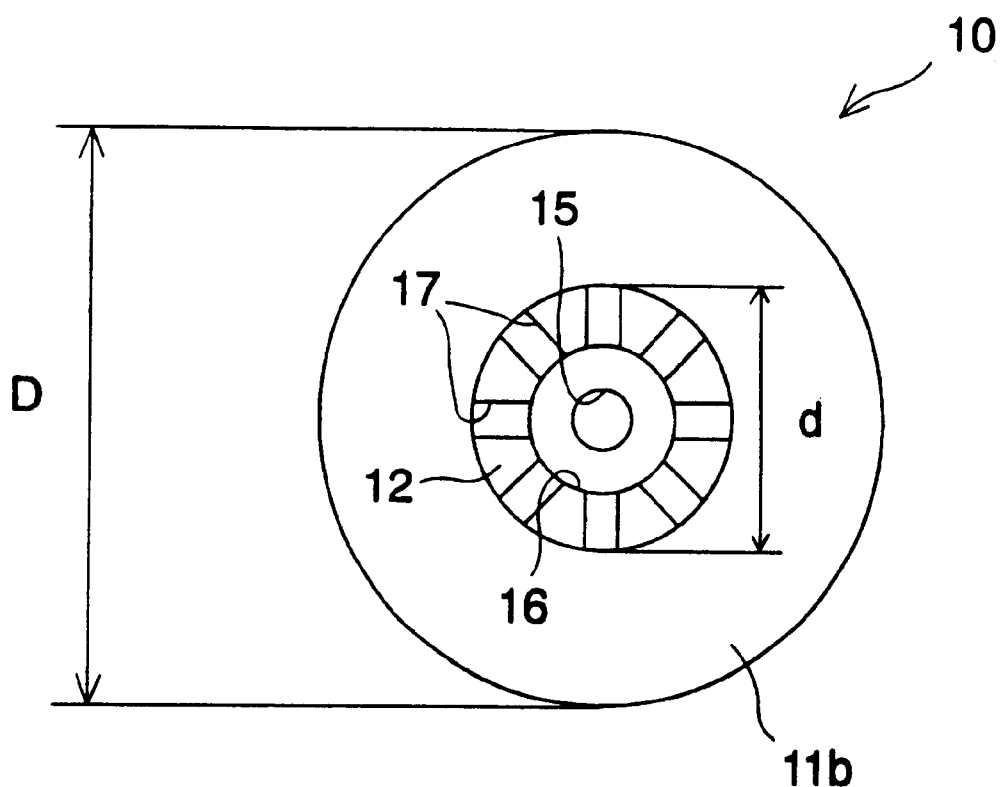
FIG. 4 is a view along arrow IV of FIG.3.

As is clearly shown in FIG. 4, multiple grooves 17 are formed on the end face of second portion 12 and define channels that open on the outer periphery of second portion 12 and that connect to hole 16 and extend radially.

Outer diameter D of first portion 11 of air vent disc 10 (FIG. 4) is slightly smaller than the hole diameter of plunger 3 and, as shown in FIG. 2, a clearance c is formed between it and the plunger inner wall, when it is assembled into plunger 3.

During operation, plunger 3 is urged in a projecting direction from the housing bore because of the fluid pressure inside chamber 20 and the force of spring 4. Tip 31 contacts an associated chain (not shown) so that a tension is applied to the chain. At such time, the force acting on plunger 3 from the chain and toward the inside of the housing is balanced with the outward force due to spring 4 and the fluid pressure inside chamber 20.

When the tension of the chain increases, the force in the reverse direction of plunger 3 originating from the chain increases. When plunger 3 is pressed in the retreating direction, the fluid pressure in chamber 20 increases while the ball check valve 6 blocks the flow of fluid from chamber 20. When the fluid pressure inside the chamber 20 exceeds a set maximum value, the valve of pressure relief valve assembly 5 opens and flow of fluid from chamber 20 is permitted.

When this pressure relief valve assembly 5 is in operation, ball 53 moves away from seat face 51c against the force of valve spring 54 because of fluid pressure in chamber 20. Then the fluid in chamber 20 passes the gap between ball 53 and seat face 51c and enters valve housing 51, passes the gap between valve housing 51 and plug member 52 (not shown) and moves to the side of air vent disc 10. Fluid then passes through hole 16, through-hole 15 and countersunk hole 14 of air vent disc 10 and, further on, open hole 31a at plunger tip 31 and flows outside of the tensioner. Thereby, the fluid pressure in chamber 20 decreases.

Next, in the case of mixing-in of air into the fluid in chamber 20, this mixed-in air flows through the gap between the outer diameter of the valve housing 51, inner diameter of plunger 3 of pressure relief valve assembly 5 and the outer diameter of air vent disc 10 to starting end 13a of groove 13 of air vent disc 10, then moves to terminal end 14b, past said groove 13, and further on it passes open hole 31a at plunger tip 31 and leaks out to the outside air together with the hydraulic oil. Excessive loss of fluid in chamber 20 to the outside of the tensioner is controlled by the circuitous path of spiral groove 13 on main surface 11a of air vent disc 10.

Figure 6:
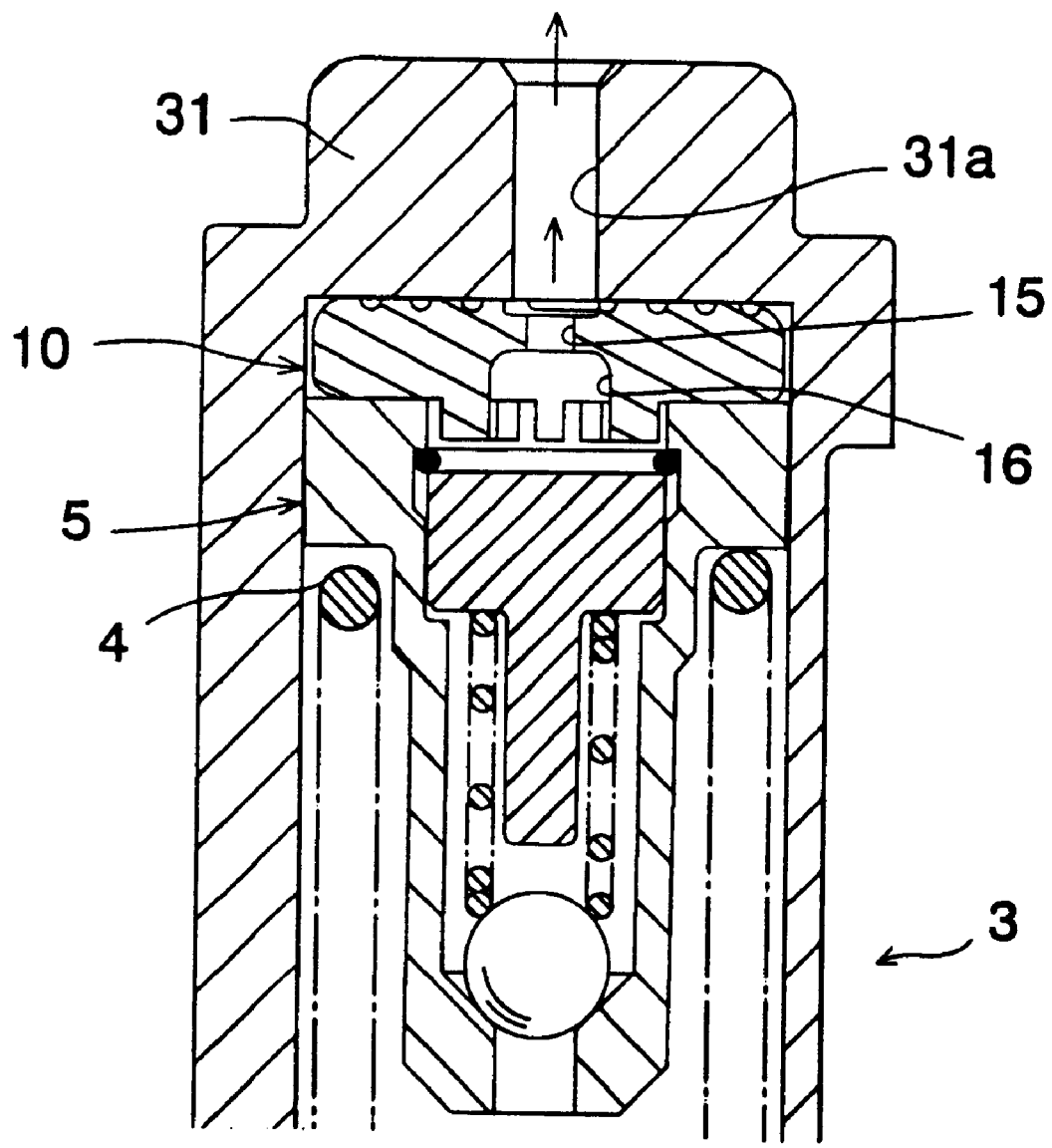
FIG. 6 illustrates the air vent disc when it is assembled correctly.

When fluid is supplied to chamber 20 and pressure is applied to chamber 20 during product inspection of hydraulic tensioner 1, the fluid in chamber 20 passes through the gap between the inner diameter of plunger 3 and the outer diameter of valve housing 51 of pressure relief valve assembly 5, just like the flow of the mixed-in air, flows into starting end 13a of groove 13 of air vent disc 10 and moves to terminal end 14b, past said groove 13 and passes through open hole 31a at plunger tip 31 to be discharged in a small quantity to the outside air (see FIG. 6).

Figure 7:
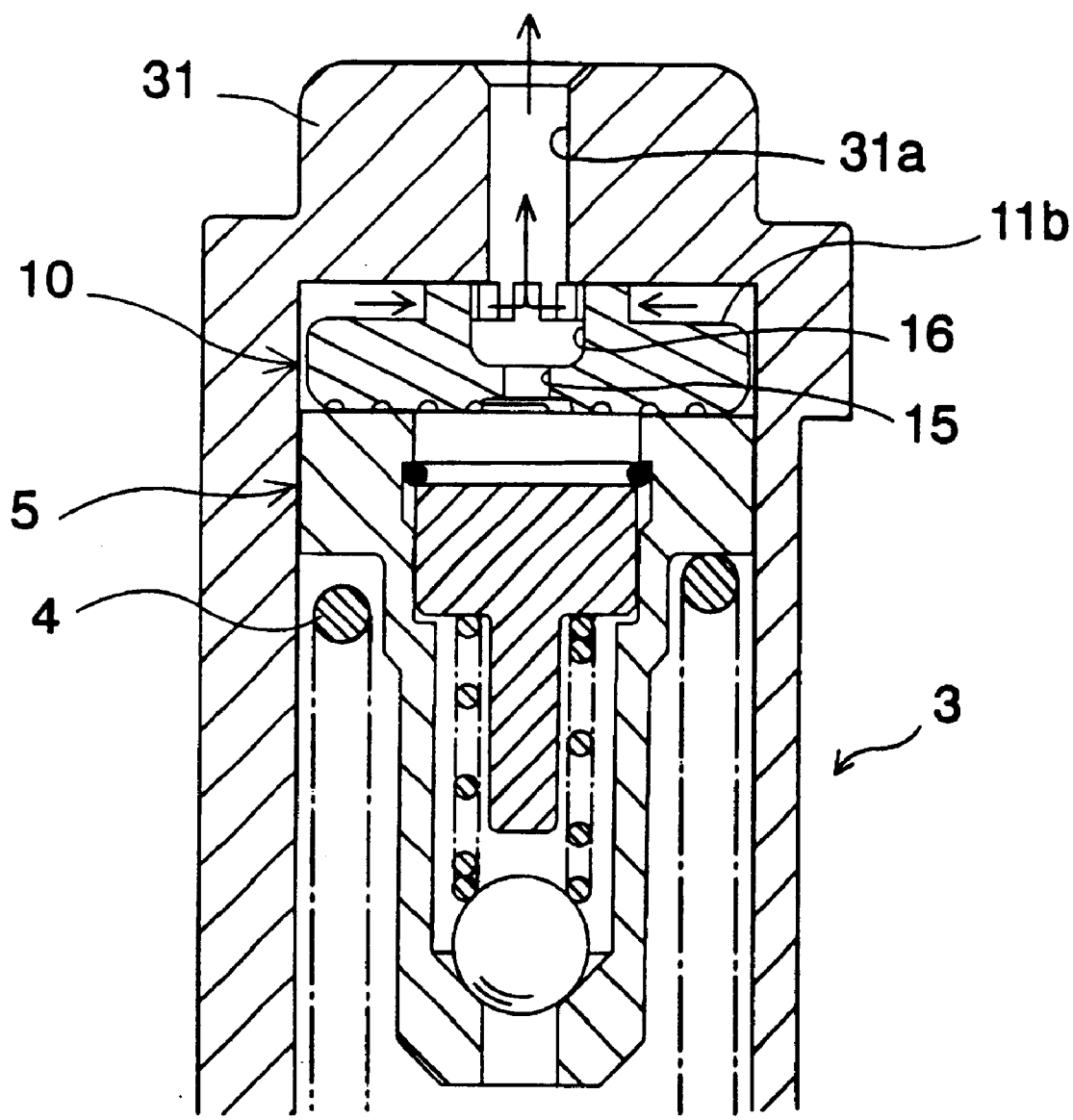
FIG. 7 illustrates the air vent disc when it is assembled incorrectly.

When the air vent disc 10 is assembled into plunger 3 with its top and bottom reversed, that is, with second portion 12 of air vent disc 10 toward the plunger tip, as shown in FIG. 7, a gap is formed between second main surface 11b of air vent disc 10 and the inner wall of plunger tip 31 because the outer diameter of the second portion 12 of air vent disc 10 is larger than open hole 31a at plunger tip 31.

Therefore, when fluid is supplied to chamber 20 and pressure is applied to chamber 20 during product inspection, the fluid in chamber 20 passes through the gap between the inner diameter of plunger 3 and the outer diameter of air vent disc 10 and flows into groove 17 from the aperture on the outer periphery of second portion 12 of air vent disc 10 and passes through axial hole 16, through-hole and countersunk hole 14, to be discharged in large quantity to the outside of the tensioner from open hole 31 a at plunger tip 31.

As such, when the air vent disc 10 is assembled incorrectly, fluid flowing out from open hole 31a at plunger tip 31 is of a large quantity, so that it enables judgment of correct or incorrect assembly. Thereby, incorrect assembly of air vent disc 10 is prevented. Incidentally, in the above example, outer diameter D of first portion 11 of air vent disc 10 is slightly smaller than the hole diameter of plunger 3, but outer diameter D of first portion 11 of air vent disc 10 can be substantially equal to the hole diameter of plunger 3 and grooves can be formed on the outer periphery of first portion 11, to extend in the direction of the center axis.

Thus, when air vent disc 10 is assembled into plunger 3, the outer diameter of first portion 11 of air vent disc 10 fits with the inner diameter of plunger 3 without clearance. The mixed-in air in chamber 20 passes through the groove on the outer periphery of first portion 11 and moves to the side of first main surface 11a of air vent disc 10, to be discharged to the outside past the vent channel on first main surface 11a.

Figure 8:
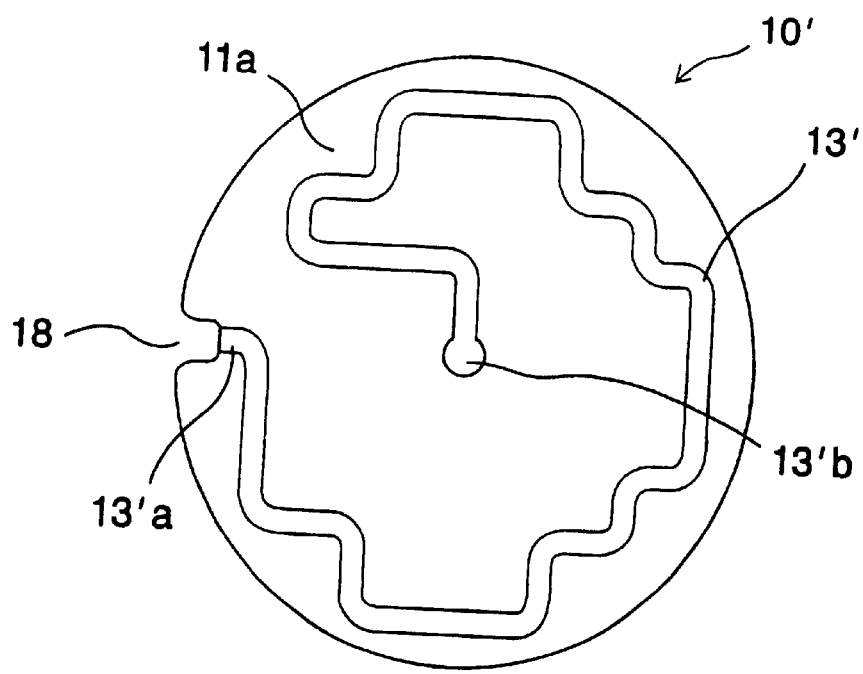
FIG. 8 illustrates a second embodiment of the air vent disc channel.
Figure 9:
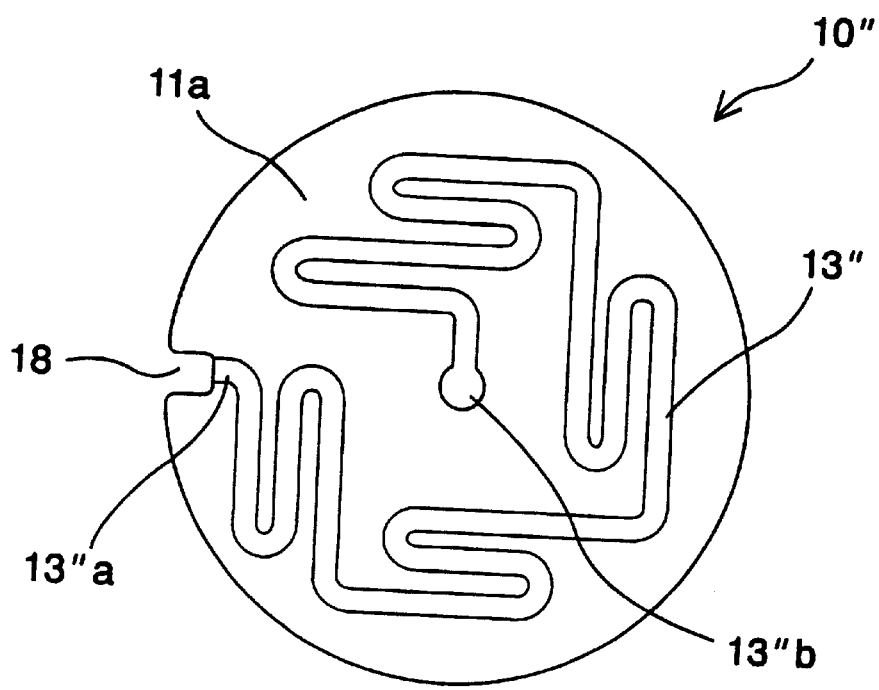
FIG. 9 illustrates a third embodiment of the air vent disc channel.
Figure 10:
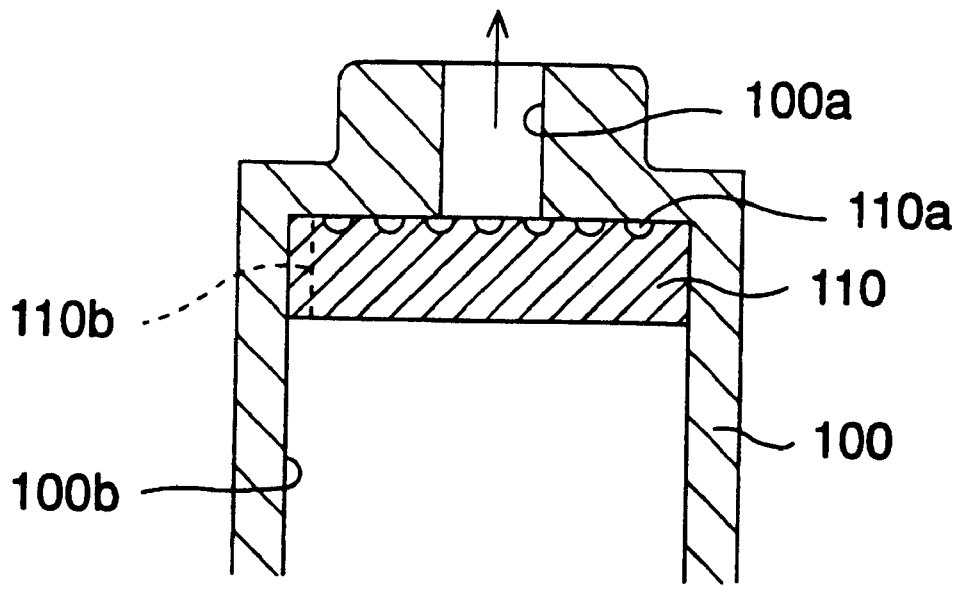
FIG. 10 is a partial enlargement of a conventional hydraulic tensioner with a correctly assembled conventional air vent disc.
Figure 11:
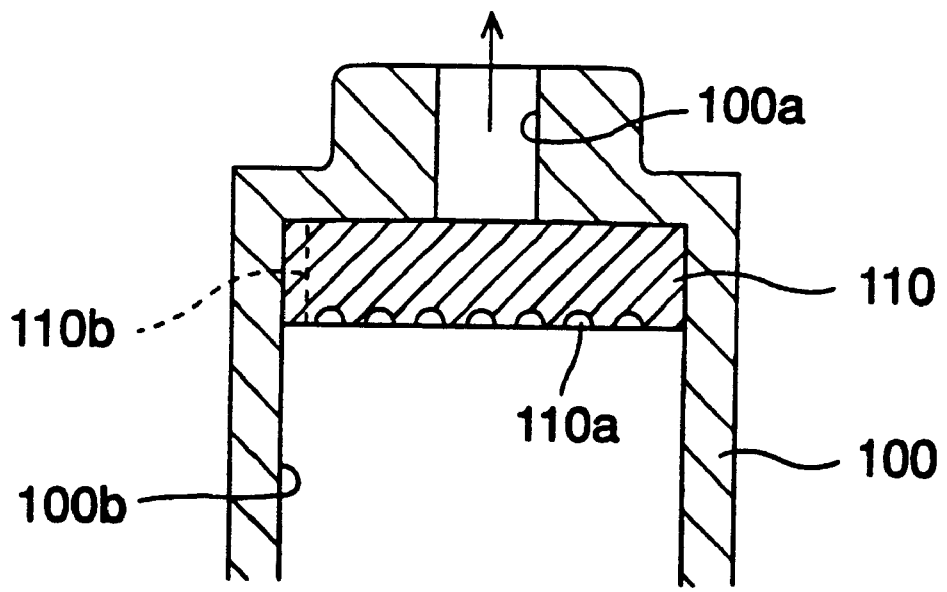
FIG. 11 is a partial enlargement of a conventional hydraulic tensioner with an incorrectly assembled conventional air vent disc.

In the above example, the vent channel is a spiral groove 13, but groove 13 is not limited to a spiral shape and, as shown in FIGS. 8 and 9, it can be composed of multiple linear portions with at least a 90 degree bend. In these FIGS., the same or equivalent elements are assigned the same reference characters.

In the case of air vent disc 10', shown in FIG. 8, groove 13' is composed of multiple linear portions with 90 degree bending from its starting end 13'a to its terminal end 13'b. Groove 18 in the axial direction (vertical to the paper surface), that connects to starting end 13'a of groove 13' is formed on the outer periphery of air vent disc 10'.

In the case of air vent disc 10", shown in FIG. 9, groove 13" is composed of multiple linear portions with 90 degree and 180 degree bending from its starting end 13"a to its terminal end 13"b. Groove 18, the same as that in FIG. 8, is formed on the outer periphery of air vent disc 10'.

In the case of both FIG. 8 and FIG. 9, the mixed-in air in chamber 3 is discharged to the outside of the tensioner by flowing through groove 13' or 13" on the side of main surface 11a from groove 18 on the outer periphery of the air vent disc.

As detailed above, in the hydraulic tensioner of this invention, a vent device is provided inside a hollow plunger. The vent device includes a first portion having a vent channel and a second portion having an outer diameter that is larger than the aperture at the plunger tip, an axial hole and a channel that opens on the outer periphery. When the vent device is assembled incorrectly and fluid pressure is applied to the chamber during product inspection, a large quantity of fluid in the chamber leaks out through the channel of the second portion of the vent device and axial hole. Thereby the product can be checked for acceptance or rejection, and incorrect assembly of the vent device can be prevented.

Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A hydraulic chain tensioner comprising:
   a housing having a bore;
   a hollow plunger slidably received within said bore and forming a fluid chamber therebetween, said hollow plunger having an upper end, said upper end having an aperture, said aperture having an inner diameter;
   a spring biasing said hollow plunger in a projecting direction from said bore; and
   a vent including a disc having a periphery, a first portion and a second portion, said first portion having a first outer diameter and a surface with a vent channel formed therein, said vent channel having a first end terminating at said periphery of said disc and a second end terminating at a position to establish a first connection between the atmosphere and said fluid chamber through said aperture when said vent is assembled in said hydraulic chain tensioner with said first portion being adjacent said plunger upper end, said first connection permitting a first quantity of fluid flow therethrough;
   said second portion being generally opposite said first portion, said second portion having an second outer diameter, said second outer diameter of said second portion being larger than said inner diameter of said aperture, said second portion having a vent bore extending in an axial direction of said second portion and at least one vent fluid passage extending from said vent bore and connecting said vent bore with an outer circumference of said second portion such that a second connection between the atmosphere and said fluid chamber is established when said vent is assembled in said hydraulic chain tensioner with said second portion being adjacent said hollow plunger upper end, said second connection permitting a second quantity of fluid flow therethrough, said second quantity being greater than said first quantity.

2. The hydraulic chain tensioner of claim 1, in which said periphery of said vent defines a clearance between said first portion of said vent and said hollow plunger.

3. The hydraulic chain tensioner of claim 1, wherein said periphery of said vent has a groove extending in said axial direction, said groove in communication with said first end of said vent channel to permit fluid flow from said fluid chamber to said first end of said vent channel.

4. The hydraulic chain tensioner of claim 1, wherein said vent channel has a circuitous path from said first end to said second end.

5. The hydraulic chain tensioner of claim 4, wherein said vent channel has a spiral shape.

6. The hydraulic chain tensioner of claim 4, wherein said vent channel includes a plurality of linear portions on said surface of said first portion of said vent, adjacent said linear portions of said vent channel being angled at least 90° with respect to each other.

7. The hydraulic chain tensioner of claim 1, wherein said vent fluid passage opening into said outer circumference of said second portion of said vent channel extends radially from said vent bore.

8. The hydraulic chain tensioner of claim 7, wherein said fluid passage is a groove formed on an end face of said second portion.

9. The hydraulic chain tensioner of claim 1, wherein said vent is biased by said spring against the inside of said upper end of said hollow plunger.

10. The hydraulic chain tensioner of claim 9, wherein said vent is constructed integrally with a pressure relief valve assembly, said pressure relief valve assembly being biased against the inside of said upper end of said hollow plunger by said spring, a through-hole being formed in the center of said first portion connected to said aperture and said vent bore to permit the flow of fluid from said pressure relief valve assembly to the atmosphere through the aperture.

11. The hydraulic chain tensioner of claim 10, wherein said second portion is inserted into an opening formed in an upper end of said pressure relief valve assembly.

12. The hydraulic chain tensioner of claim 1, further comprising a fluid passage formed in said housing to connect said chamber with an external source of pressurized fluid.

13. The hydraulic chain tensioner of claim 12, wherein a check valve is provided between said fluid chamber and said external source of pressurized fluid to permit fluid flow into said chamber while preventing flow in the reverse direction.

* * * * *